Oct. 14, 1941.    B. J. DUFFY, SR    2,258,884
POULTRY TENDON PULLER
Filed Aug. 25, 1939

INVENTOR.
Benjamin J. Duffy, Sr.
BY A.B.Bowman
ATTORNEY.

Patented Oct. 14, 1941

2,258,884

UNITED STATES PATENT OFFICE 2,258,884

POULTRY TENDON PULLER

Benjamin J. Duffy, Sr., Burbank, Calif.

Application August 25, 1939, Serial No. 291,880

2 Claims. (Cl. 17—11.3)

My invention relates to a poultry tendon puller for use in extracting tendons or sinews from the fleshy portions of the legs of poultry in preparing them for food, and the objects of my invention are:

First, to provide a poultry tendon puller of this class which breaks both legs of a fowl and extracts the tendons or sinews therefrom in one operation;

Second, to provide a poultry tendon puller of this class which is very simple and easy to operate and is very fast and thorough in pulling the tendons or sinews from the fleshy portion of the legs of poultry;

Third, to provide a poultry tendon puller of this class in which angular slots for receiving poultry legs are parallel, thus providing ease of placing said legs therein;

Fourth, to provide a poultry tendon puller of this class in which the operating lever is shiftable in various directions in relation to the feet holder thereof to permit ease of breaking the legs of poultry;

Fifth, to provide a poultry tendon puller of this class in which the angles of the feet holding slots and the slots in connection with the lever thereof cooperate in breaking the legs of poultry;

Sixth, to provide a poultry tendon puller of this class in which the fleshy portions of a fowl's legs are wedged more securely in the slots in connection with the lever thereof as said fleshy portions are pulled from the tendons in connection with said fowl's feet;

Seventh, to provide a poultry tendon puller of this class with novel and efficient feet and leg supporting means;

Eighth, to provide a poultry tendon puller of this class which is so constructed that great pressure may be provided for pulling the tendons of both legs of large fowl at one time;

Ninth, to provide a poultry tendon puller of this class which is very simple and economical of construction, efficient in its action and which will not readily deteriorate or get out of order.

Figures 2, 3:
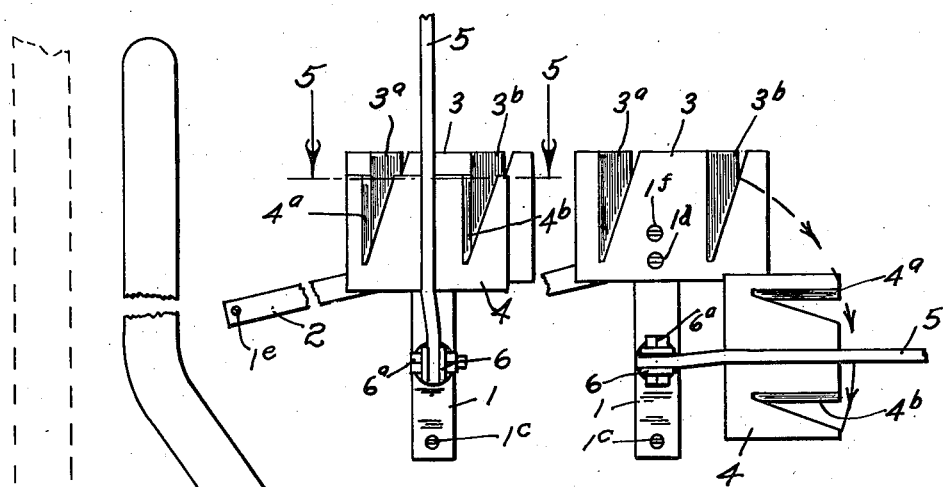
Figure 5:
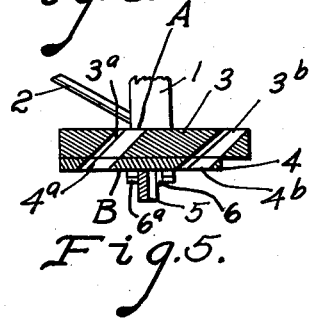
Figure 1:
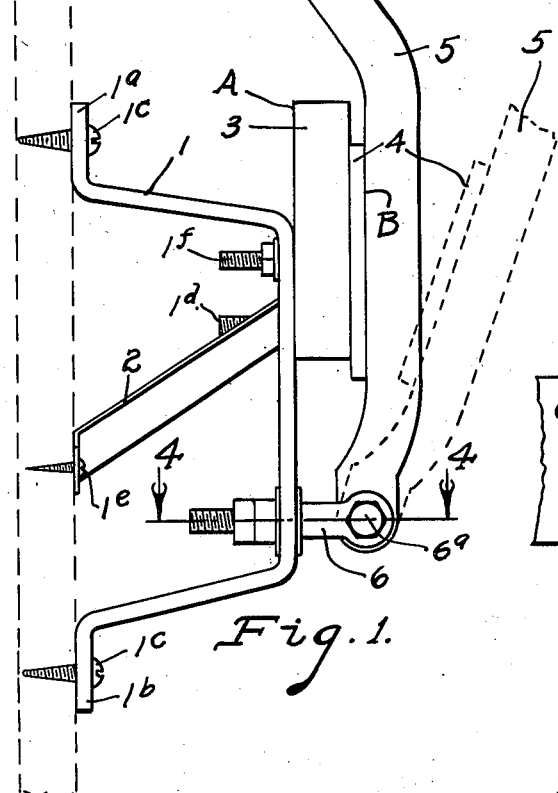
Figure 4:
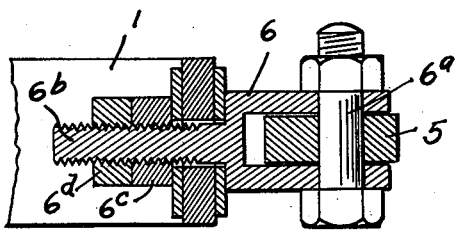

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a fragmentary side elevational view of my poultry tendon puller showing by dash lines a varying position of the lever thereof and also showing by dash lines a wall or other member to which my poultry tendon puller is secured in operative position; Fig. 2 is a fragmentary front elevational view showing my poultry tendon puller substantially in the same position as in Fig. 1 but shown on a reduced scale; Fig. 3 is a similar view to Fig. 2 showing the lever of my poultry tendon puller shifted to one side and downwardly; Fig. 4 is an enlarged fragmentary sectional view taken from the line 4—4 of Fig. 1 showing some of the parts in elevation to facilitate the illustration and Fig. 5 is a fragmentary sectional view taken from the line 5—5 of Fig. 2.

Similar characters of reference refer to similar parts and portions throughout the several views of the drawing:

The supporting bracket member 1, the supporting bracket member brace 2, feet holder member 3, leg holder member 4, operating lever 5 and the lever connecting member 6 constitute the principal parts of my poultry tendon puller.

The supporting bracket 1 is substantially flat and U shaped and is provided with substantially right angled end portions 1a and 1b in which are positioned screws 1c which are adapted to secure said bracket member 1 to a wall or other surface. Secured to the inner surface of the bracket member 1 by means of the bolt 1d in its one end is an angularly extending brace member 2 which is secured to a wall or other surface at its other end by means of a screw 1e.

Secured on the outer surface of the supporting bracket member 1 by means of the bolts 1d and 1f is the feet holder member 3, in which are arranged angular slots 3a and 3b which are arranged to hold the feet of poultry during the operation of extracting the tendons from the legs of said poultry. These slots 3a and 3b are angularly arranged in said feet holder member 3 and are parallel to each other as shown in Fig. 5. The slots 3a and 3b are substantially V shaped to permit the poultry feet to be wedged therein as shown best in Fig. 3.

The leg holder member 4 is secured to the lever 5 by welding or otherwise and is provided with slots 4a and 4b which are similar to the slots 3a and 3b of the feet holder member 3, and said slots 4a and 4b are arranged to correspond in angular alignment with said slots 3a and 3b.

The lever 5 at its lower end is pivotally mounted in the lever connecting member 6 by means of the bolt 6a as shown best in Figs. 1 and 4 of the drawing.

The connecting member 6 is revolubly mounted in the bracket member 1 by means of its extending screw threaded portion 6b and nuts 6c and 6d as shown best in Figs. 3 and 4 of the drawing.

The operation of my poultry tendon puller is substantially as follows:

Assuming that my poultry tendon puller is secured to a wall substantially in the position as shown in Figs. 1 and 2 of the drawing, and that a person wishes to extract the tendons from a turkey or other fowl's legs, the fowl's legs are placed and wedged in the slots 3a and 4a, 3b and 4b respectively, with the feet protruding from the side A of the feet holder member 3 and the fleshy portions of the fowl's legs extending from the side B of the leg holder member 4, as shown best in Figs. 1 and 5 of the drawing. The lever 5 is then pulled outwardly and downwardly in connection with the leg holder member 4 and the fleshy portions of the fowl's legs are pulled away from the feet while the tendons in connection therewith are extracted from said fleshy portions of the fowl's legs.

It will be noted that the slots 3a and 3b are angularly positioned substantially 45° from the operating direction of the lever 5 as it moves outwardly and downwardly. Therefore the fowl's legs are pulled at an angle of substantially 45° and are thereby broken, this part of the operation occurring soon after the lever 5 has been pulled outwardly a short distance. The fowl's feet and its leg tendons remain in the feet holder member 3 and are completely dismembered from the fleshy portions of its legs.

It will be further noted that the lever 5 may be shifted to the side by means of the revolubly mounted lever connecting member 6 to accomplish the leg breaking operation if desired as shown best in Fig. 3, or the lever 5 may be fixed in an upright position by means of the nuts 6c and 6d on the lever connecting member 6, as shown best in Figs. 1 and 4.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. A poultry tendon puller comprising a feet holder having grooves angularly disposed in cross section relative to said feet holder, a leg holder having grooves angularly disposed in cross section relative to said leg holder and arranged to be positioned in alignment with the grooves of the feet holder, and means for separating said holders by an outward movement relative to one another or a lateral movement relative to one another, whereby tendons may be pulled and the feet completely severed by either an outward or lateral movement only, or a combination of both.

2. A poultry tendon puller comprising a feet holder having a pair of substantially V-shaped spaced grooves angularly disposed in cross section relative to said feet holder, a leg holder having similar arranged and shaped grooves arranged to be positioned in alignment with the grooves of the feet holder and means for separating said holders by an outward movement relative to one another, or a lateral movement relative to one another whereby tendons may be pulled and the feet completely severed by either an outward or lateral movement only, or a combination of both.

BENJAMIN J. DUFFY, Sr.